United States Patent
Feld et al.

(10) Patent No.: US 9,952,919 B2
(45) Date of Patent: Apr. 24, 2018

(54) SEMANTIC DEDUPLICATION

(71) Applicant: Siemens Aktiengesellschaft, Munich (DE)

(72) Inventors: Joachim Feld, Nuremberg (DE); Ludger Fiege, Grafing (DE); Johannes Riedl, Ergolding (DE); Thomas Schmid, Leinfelden-Echterdingen (DE); Andreas Zirkler, Munich (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 60 days.

(21) Appl. No.: 15/028,461

(22) PCT Filed: Aug. 26, 2014

(86) PCT No.: PCT/EP2014/068048
§ 371 (c)(1),
(2) Date: Apr. 11, 2016

(87) PCT Pub. No.: WO2015/051945
PCT Pub. Date: Apr. 16, 2015

(65) Prior Publication Data
US 2016/0255006 A1    Sep. 1, 2016

(30) Foreign Application Priority Data
Oct. 11, 2013 (EP) .................................. 13188333

(51) Int. Cl.
*G06F 11/00* (2006.01)
*G06F 11/07* (2006.01)
(Continued)

(52) U.S. Cl.
CPC ...... *G06F 11/0709* (2013.01); *G06F 11/0751* (2013.01); *G06F 11/183* (2013.01);
(Continued)

(58) Field of Classification Search
CPC ............. G06F 11/0709; G06F 11/0751; G06F 11/183; G06F 11/2007; G06F 11/3013;
(Continued)

(56) References Cited

U.S. PATENT DOCUMENTS

| 6,233,704 B1 * | 5/2001 | Scott ..................... G06F 13/426 709/200 |
| 7,269,762 B2 | 9/2007 | Heckmann et al. ......... 714/47.1 |

(Continued)

FOREIGN PATENT DOCUMENTS

| DE | 10223880 A1 | 1/2004 | ................ B60T 8/88 |
| WO | 2015/051945 A1 | 4/2015 | .............. G06F 11/18 |

OTHER PUBLICATIONS

Maccari, L. et al., "Mesh Network Firewalling with Bloom Filters," IEEE International Conference on Communications, pp. 1546-1551, 2007.

(Continued)

*Primary Examiner* — Joseph D Manoskey
(74) *Attorney, Agent, or Firm* — Slayden Grubert Beard PLLC

(57) ABSTRACT

In order to reduce data traffic in a network, a master node sends master data to at least one checking instance. The master data are checked by the checking instance. In the absence of errors, either the master data or slave data determined by the slave node are sent by the checking instance to the data-processing unit. When an error is recognized, all master data and slave data available at the checking instance are sent by the checking instance to the data-processing unit.

14 Claims, 4 Drawing Sheets

(51) Int. Cl.
- *G06F 11/18* (2006.01)
- *G06F 11/20* (2006.01)
- *G06F 11/30* (2006.01)
- *H04L 12/40* (2006.01)
- *H04L 12/42* (2006.01)
- *H04L 12/801* (2013.01)
- *H04L 29/08* (2006.01)

(52) U.S. Cl.
CPC ...... *G06F 11/2007* (2013.01); *G06F 11/3013* (2013.01); *H04L 12/40182* (2013.01); *H04L 12/42* (2013.01); *H04L 47/12* (2013.01); *H04L 67/125* (2013.01)

(58) Field of Classification Search
CPC ................. G06F 11/3048; H04L 47/12; H04L 12/40182; H04L 12/42
USPC ....................................... 714/49, 4.2, 4.1, 43
See application file for complete search history.

(56) References Cited

U.S. PATENT DOCUMENTS

| | | | | |
|---|---|---|---|---|
| 2009/0268609 | A1* | 10/2009 | Koch | H04L 12/423 370/222 |
| 2010/0188972 | A1* | 7/2010 | Knapp | H04L 12/43 370/226 |
| 2011/0029806 | A1* | 2/2011 | Nunes | H04L 12/437 714/4.1 |
| 2015/0003241 | A1* | 1/2015 | Rhee | H04L 47/13 370/230 |

OTHER PUBLICATIONS

"IEC 62439-3 Industrial communication networks—High availability automation networks—Part 3: Parallel Redundancy Protocol (PRP) and High-availability Seamless Redundancy (HSR)" Edition 2.0, 182 pages, 2012.
International Search Report and Written Opinion, Application No. PCT/EP2014/068048, 16 pages, Dec. 12, 2014.

* cited by examiner

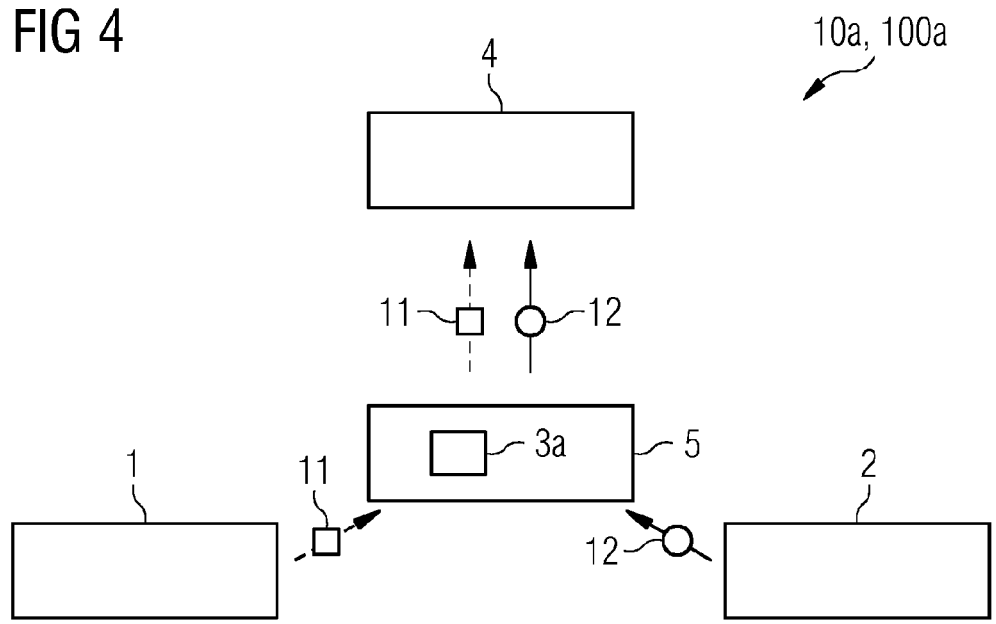
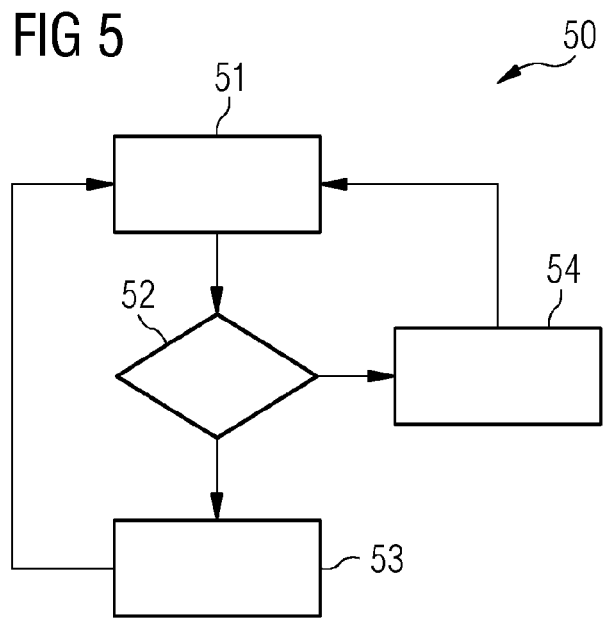

SEMANTIC DEDUPLICATION

CROSS-REFERENCE TO RELATED APPLICATIONS

This application is a U.S. National Stage Application of International Application No. PCT/EP2014/068048 filed Aug. 26, 2014, which designates the United States of America, and claims priority to EP Application No. 13188333.2 filed Oct. 11, 2013, the contents of which are hereby incorporated by reference in their entirety.

TECHNICAL FIELD

The invention relates to the technical field of reduction of a data load in a network.

BACKGROUND

In security-critical environments, data frequently need to be sent redundantly or physical variables need to be measured and sent redundantly. Redundancy is necessary only in the event of error, however, and normally doubles the resources used, e.g. network bandwidth.

Particularly in the case of fail-operational systems, for example steer-by-wire systems in motor vehicles, redundant units are installed that are each linked via a redundant communication system to a processing control unit, e.g. a central computer. As a result, e.g. a measured value, for example the actual steering angle, is redundantly captured and in each case redundantly transmitted, i.e. received on the central computer four times. If the measured values are data having a large bandwidth, such as images from a stereo camera or radar echoes, then the quadrupling of the data has palpable effects on the network utilization level and network design. The larger dimensioning of the network has effects on unit cost, which is critical particularly in the automotive sector.

In this regard, a method is known according to which only one of the redundant nodes, what is known as the master, operates and sends data while the other, what is known as the slave, just monitors the function of the master and steps in in the event of error (absent or erroneous message). This involves the use of disjunct communication paths. It is possible for multiple slaves to be available for the same datum in order to further increase the reliability of the overall system.

Related approaches: High-availability Seamless Redundancy (HSR) defined in IEC 62439-3, an Ethernet protocol for filtering redundant messages in a ring. It does so by using tags on individual messages in order to recognize redundant transmissions without checking the content of the messages themselves.

Related approaches: in generally mesh networks, filtering is used in order to save bandwidth or to prevent the spread of undesirable content (Firewall). In this connection, there are related works in the field of wireless mesh networks, which are geared to reconfigurable networks with for the most part probabilistic approaches (cf. Mesh network firewalling with Bloom Filters, IEEE International Conference on Communications (ICC'07), 2007), however, these not being able to be used for the security-critical communication presented here.

SUMMARY

One embodiment provides a method for reducing the data traffic in a network, comprising the steps of sending of master data from a master node to at least one checking entity; checking of the master data by the checking entity; in the event of there being no error, sending of either the master data or slave data ascertained by the slave node from the checking entity to the data processing unit; and in the event of an error being recognized, sending of all master data and slave data available on the checking entity from the checking entity to the data processing unit.

In a further embodiment, the master node, the checking entity and the data processing unit are connected to a ring topology, and are preferably arranged in the ring topology.

In a further embodiment, the slave node checks the master data by carrying out the same operations as the master node and thus produces slave data that are redundant in relation to the master data.

In a further embodiment, the slave node carries out the same operations as the master node only if the checking entity has recognized an error.

In a further embodiment, a network coupler that is separate from the slave node comprises or is the checking entity.

In a further embodiment, the slave node comprises or is the checking entity.

In a further embodiment, the master node comprises a further checking entity.

Another embodiment provides a system comprising a master node, a slave node and a data processing unit, which are connected to a ring topology; wherein the master node is adapted to send master data that it ascertains to the data processing unit and to the slave node in respectively different ring directions; wherein the slave node is adapted to send slave data that it ascertains to the data processing unit and to the master node in respectively different ring directions; and wherein the slave node is adapted to check the master data, to send only the master data or the slave data to the data processing unit during normal operation, but to send both the master data and the slave data to the data processing unit in the event of an error being recognized.

In a further embodiment, the master node is adapted to check the slave data, to send only the slave data or the master data to the data processing unit during normal operation, but to send both the master data and the slave data to the data processing unit in the event of an error being recognized.

In a further embodiment, the data processing unit is adapted to take a countermeasure in the event of the master node or the slave node failing.

In a further embodiment, the master node and/or the slave node is adapted to recognize failure of a communication link between the master node and the slave node and to send a piece of degradation information to the data processing unit in the event of failure being recognized.

In a further embodiment, the data processing unit is adapted to send a piece of status information, embodied as degradation information, to the master node in the event of a communication link between the slave node and the data processing unit failing, and the master node is adapted to forward slave data received from the slave node to the data processing unit in the event of degradation being recognized.

In a further embodiment, the data processing unit is adapted to send a piece of status information, embodied as degradation information, to the slave node in the event of a communication link between the master node and the data processing unit failing, and the slave node is adapted to forward slave data received from the master node to the data processing unit in the event of degradation being recognized.

In a further embodiment, the system includes hardware and/or software configured to perform a method as disclosed above.

Another embodiment provides a method for reducing the data traffic in a network that comprises a master node, a slave node and a data processing unit; wherein the master node, the slave node and the data processing unit are connected to a ring topology, the method comprising the steps of: sending of master data ascertained by the master node to the data processing unit and to the slave node in respectively different ring directions; sending of slave data ascertained by the slave node to the data processing unit and to the master node in respectively different ring directions; and checking of the master data by the slave node, wherein if the check on the master data indicates normal operation, the slave node sends only the master data or only the slave data to the data processing unit, and wherein the slave node sends both the master data and the slave data to the data processing unit in the event of an error being recognized.

In a further embodiment, the master node checks the slave data and sends only the slave data or only the master data to the data processing unit during normal operation, but sends both the master data and the slave data to the data processing unit in the event of an error being recognized.

BRIEF DESCRIPTION OF THE DRAWINGS

Example embodiments and aspects of the invention are explained in more detail below with reference to the figures, in which:

FIG. 4 shows a block diagram of a system according to a further embodiment; and

FIG. 5 shows a flowchart according to a further embodiment of the invention.

DETAILED DESCRIPTION

Embodiments of the present invention provide a method for reducing the data traffic in a network is presented. To this end, master data for a master node are sent to at least one checking entity. The master data are checked by the checking entity. In the event of there being no error, either the master data or slave data ascertained by the slave node are sent from the checking entity to the data processing unit. In the event of an error being recognized, all master data and slave data that are available through the checking entity are sent from the checking entity to the data processing unit.

According to a further aspect, a system is presented that comprises means that are adapted to perform such a method.

According to a further aspect, a system for reducing the data traffic in a network is presented. The system comprises a master node, a slave node and a data processing unit. The master node and/or the slave node and/or the data processing unit are connected to a ring topology. The master node is adapted to send master data that it ascertains to the data processing unit and to the slave node in respectively different ring directions. The slave node is adapted to send slave data that it ascertains to the data processing unit and to the master node in respectively different ring directions. The slave node is adapted to check the master data and to send either only the master data or only the slave data to the data processing unit during normal operation. The slave node is adapted to send both the master data and the slave data to the data processing unit in the event of an error being recognized.

According to a further aspect, a method for reducing the data traffic in a network is presented. The network comprises a master node, a slave node and a data processing unit. The master node and/or the slave node and/or the data processing unit are connected to a ring topology. The master node sends master data ascertained by it to the data processing unit and to the slave node in respectively different ring directions. The slave node sends slave data ascertained by it to the data processing unit and to the master node in respectively different ring directions. The master data are checked by the slave node. If the check on the master data indicates normal operation, the slave node sends only the master data or only the slave data to the data processing unit. If the check on the master data indicates an error, that is to say in the event of an error being recognized, then the slave node sends both the master data and the slave data to the data processing unit.

According to one embodiment, the network topology is chosen such that the data from the master node, also called the master, pass through the slave node, also called the slave, on the way to the central computer, and at the same time the data from the slave pass through the master on the way to the central computer. Preferably, a ring topology is proposed therefor.

Figure 1:
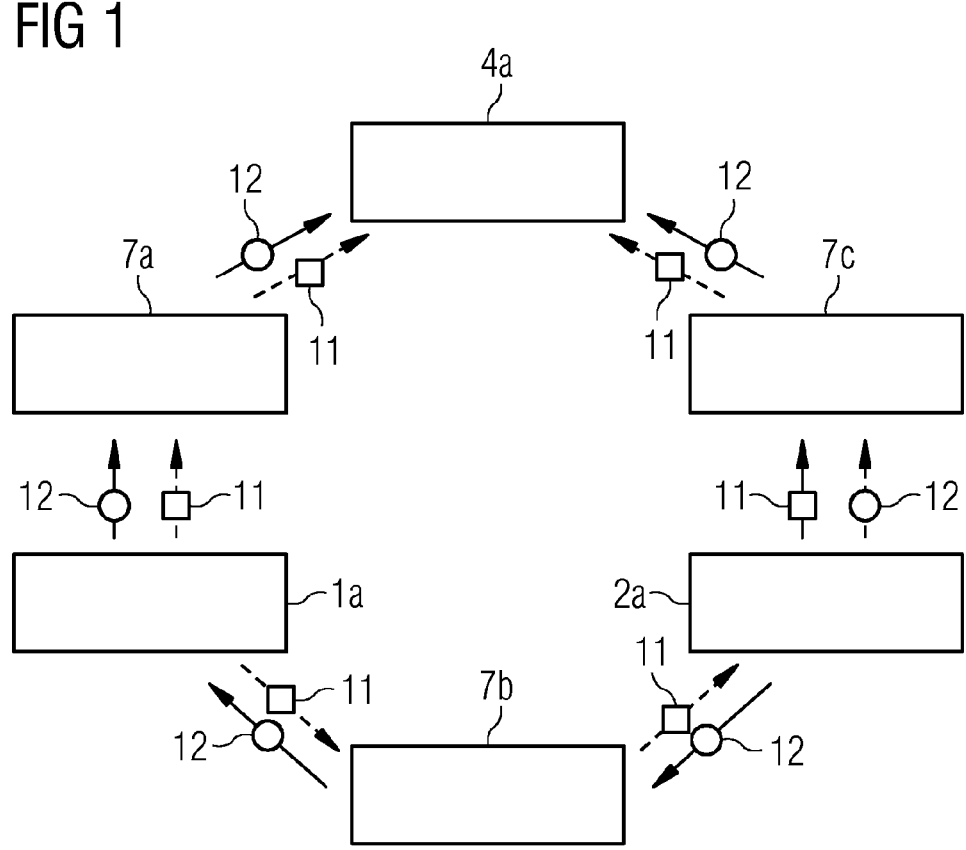
FIG. 1 shows a block diagram of a ring network.

Such a topology is shown in FIG. 1, for example. The ring topology comprises a master node 1a, a slave node 2a and a data processing unit 4a embodied as a central computer, these being able to be arranged together with further nodes 7a-c in the ring topology.

In a network having the properties described above, the master node 1a sends data 11. The slave node 2a carries out the same operations as the master 1a and produces and sends redundant data 12, this also being referred to as hot standby. Both send their data redundantly, for example in both directions in the ring, to the central computer, cf. solid and dashed arrows in FIG. 1.

Figure 2:
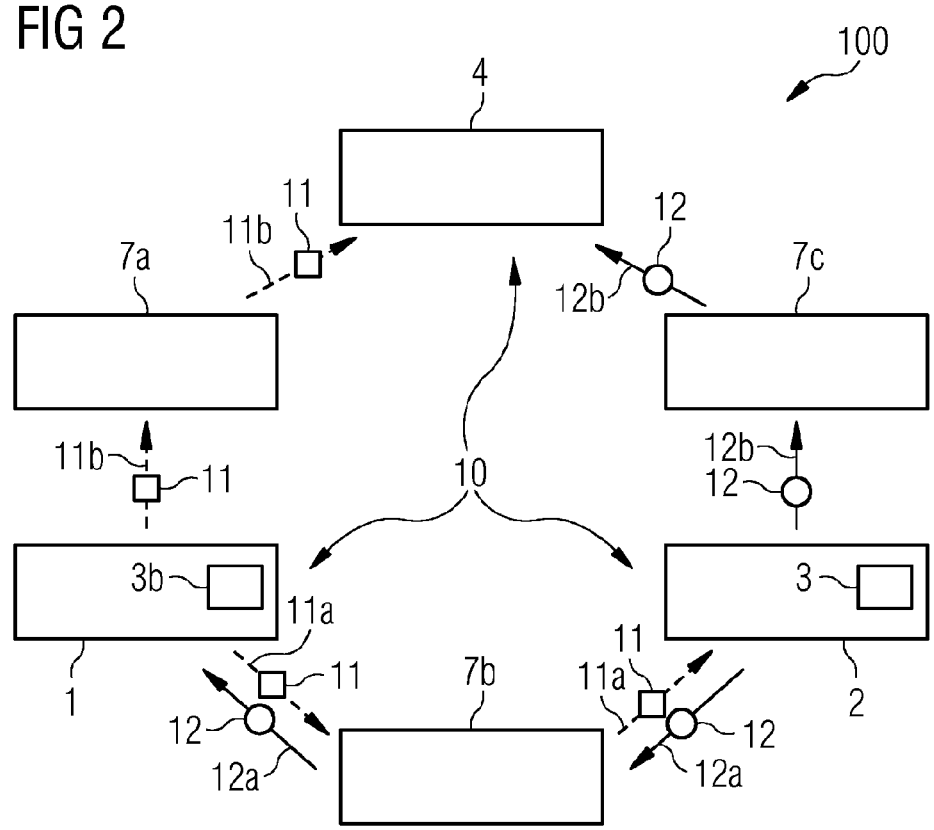
FIG. 2 shows a block diagram of a ring network according to one embodiment.

FIG. 2 shows a network 100. The network 100 comprises a system 10 according to one embodiment of the invention. The system 10 comprises a master node 1, a slave node 2 and a data processing unit 4, these being arranged in a ring topology. According to a generalization of this embodiment, the master node 1, the slave node 2 and/or the data processing unit 4 do not necessarily have to be arranged in a ring topology, however, but rather it is sufficient if one, a plurality or all of them are connected to the ring topology. By way of example, the master node 1, the slave node 2 and/or the data processing unit 4 may be connected (not shown) to the ring topology remotely from the ring topology by a line or even a further network, so that the master node 1, the slave node 2 and/or the data processing unit 4 still communicate with one another via the ring topology. In other words: the master node 1, the slave node 2 and/or the data processing unit 4 are then in a topology that includes one or more rings. A node 1, 2, 4 arranged in the ring topology is naturally also deemed to be connected to the ring topology. The ring topology can comprise one or more rings. The network 100 can additionally comprise further nodes 7a-7c. The master node 1 is adapted to send master data 11 ascertained by it to the data processing unit 4 and to the slave node 2 in respectively different ring directions, represented by the data streams 11a, 11b. The slave node 2 is adapted to send slave data 12 ascertained by it to the data processing unit 4 and to the master node 1 in respectively different ring directions, represented by the data streams 12a, 12b. The slave node 2 is adapted to check the master data 11. To this end, it comprises a checking entity 3, for example. If the result of the check on the master data 11 by the slave node 2 is that the system 10 and/or the master node 1 is operating normally, then the slave node 2 sends only the master data 11 or only the slave data 12 to the data processing unit 4. During normal operation, the slave node 2 preferably terminates the master data 11 received by the slave node and sends only slave data 12 generated by the slave node 2 to the data processing unit 4 by means of the data stream 12*b*. As a result, the data sent from the slave node 2 to the data processing unit 4 do not first of all still have to cover the distance from the master node 1 to the slave node 2. If the check on the master data 11 by the slave node 2 recognizes that the master data 11 and/or the system 10 and/or the master node 1 have an error, however, then the slave node 2 sends both the master data 11 and the slave data 12 to the data processing unit 4.

In other words: according to this embodiment of the invention, the slave node 2 therefore monitors the functionality of the master 1 by inspecting the data stream 11*a* from the master 1. To this end, the slave node 2 checks the syntactic and semantic correctness of the data 11. By way of example, these checks can include:

- Checks on the data packets for correctness, e.g. CRC check;
- If the sender of the data itself is of redundant design, e.g. includes two physical sensors, comparison of the two data that the packet includes for identity (delta consistency);
- Comparison of the received data with the data measured by the slave itself (delta consistency);
- Comparison of the data with the most recently received data and plausibilization of the change (gradient);
- Comparison of the data with a known admissible value range (plausibilization);
- Divergence of timing from the instant at which a packet is expected from the master in accordance with a given schedule.

Only in the event of errors being recognized does the slave node forward the data 12 received from the master node 1 to the central computer 4 in the network in addition to the data 11 that it has produced itself.

According to one preferred embodiment, the master node 1 for its part carries out the same checks and the same method with the slave data 12 that it has received from the slave 2 by means of the data stream 12*a*, and forwards the data 12 from the slave 2 to the data processing unit 4 likewise only in the event of an error being recognized. FIG. 2 therefore shows the system 10 and the data streams in the event of there being no error.

According to one preferred embodiment, the master node 1 is therefore adapted to check the slave data 12. During normal operation, the master node 1 sends only the slave data 12 or the master data 11 to the data processing unit 4. So that the data received by the data processing unit 4 take the shortest possible communication paths, the master node 1 preferably sends only the master data 11 to the data processing unit 4 by means of the data stream 11*b* during normal operation. In the event of an error being recognized, however, the master node sends both the master data 11 and the slave data 12 to the data processing unit 4, in a manner similar to that shown in FIG. 1.

On the basis of FIG. 2, it can be seen that, according to preferred embodiments, only one data stream (per direction) now needs to be transmitted at each link in the ring, and the required network bandwidth has, assuming a full-duplex network, been halved. As a result, the remaining bandwidth can be used for other data or the network can be produced in smaller dimensions.

Figure 3:
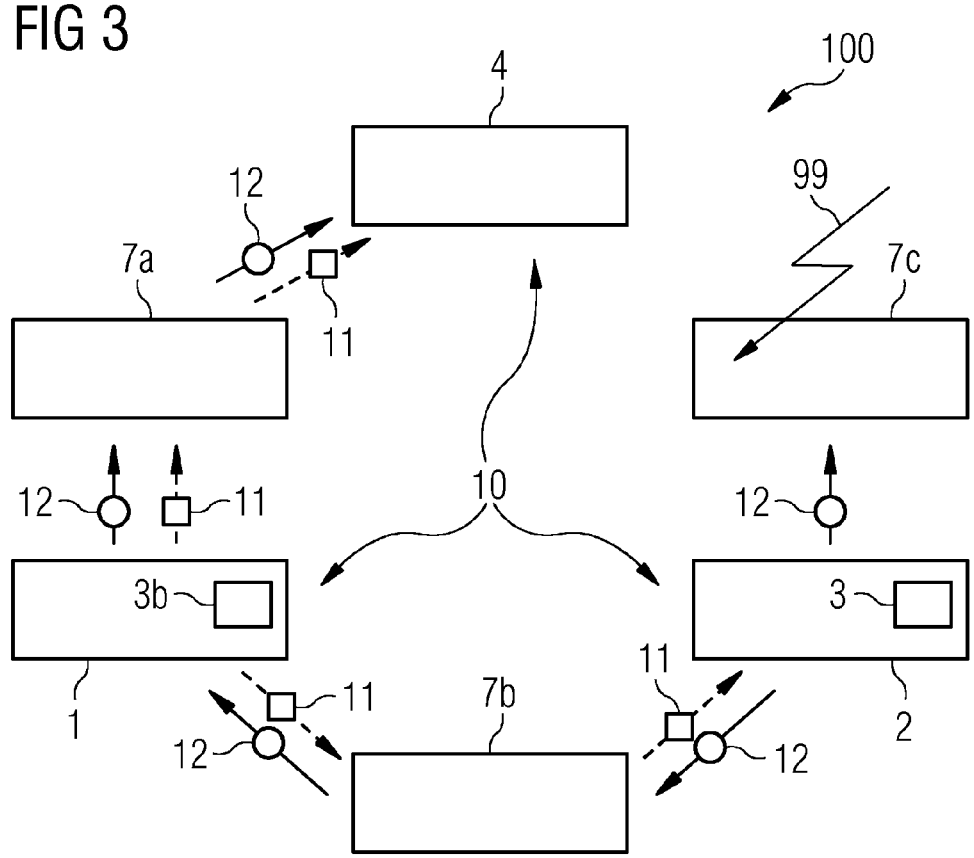
FIG. 3 shows the ring network from FIG. 2 in the event of a communication link being interrupted.

Nevertheless, the central computer 4 obtains all the information. At the same time, any single error cannot result in the central computer 4 no longer being provided with data:

- If the master 1 or the slave 2 fails, the data from the other one are still available. The central computer 1 recognizes the degradation of the system 10 and may need to take countermeasures, e.g. abortion of a mission. According to one embodiment, the data processing unit 4 is therefore adapted to take a countermeasure in the event of the master node 1 or the slave node 2 failing.
- If the communication link between master 1 and slave 2 fails, the master 1 and the slave 2 recognize this. One or both then forward corrupt data from the other or deliver a piece of status information indicating that expected packets have not arrived. The central computer 4 can recognize the degradation and react in a suitable manner. According to one embodiment, the master node 1 and/or the slave node 2 is therefore adapted to recognize the failure of a communication link between the master node 1 and the slave node 2 and, in the event of failure being recognized, to send a piece of degradation information to the data processing unit 4.
- If the communication link between master 1 or slave 2 and central computer 4 fails, the central computer 4 now obtains only the data from the other. FIG. 3 shows an embodiment in which the communication link has been interrupted as a result of an interruption 99 between the slave node 2 and the central computer 4. The central computer 4 recognizes the degradation of the system and may need to take countermeasures, e.g. abortion of a mission. In further embodiments, the availability of the overall system can be increased by virtue of the central computer 4 sending status information about the received data to the units. It is thus possible, e.g. in the event of a failure in the right communication link, for the master 1 to be asked to forward the data from the slave 2, even though it does not recognize them as erroneous, cf. FIG. 3. Hence, despite a defective communication path, the sensor redundancy is restored. According to one embodiment, the data processing unit 4 is therefore adapted to send a piece of status information embodied as degradation information to the master node 1 in the event of a communication link between the slave node 2 and the data processing unit 4 failing, and the master node 1 is adapted to forward the slave data 12 received from the slave node 2 to the data processing unit 4 in the event of degradation being recognized. According to one embodiment, the data processing unit 4 is adapted to send a piece of status information embodied as degradation information to the slave node 2 in the event of a communication link between the master node 1 and the data processing unit 4 failing, and the slave node 2 is adapted to forward the slave data 12 received from the master node 1 to the data processing unit 4 in the event of degradation being recognized.

According to further embodiments, packets from the master 1 in the data stream of the network are identified and are examined by the slave 2. This can be done on the basis of the sender address, or, in the case of function-specific addressing, also by means of the destination address. In an Ethernet-based network, the identification of the relevant data packets is preferably performed by a switch that the node includes, i.e. in hardware, in order to protect the CPU from excessive processing effort.

In contrast to the aforementioned Ethernet protocol of High-availability Seamless Redundancy (HSR), the present invention extends the check for the message content in order to be able to filter messages that are the same in terms of semantics or content or messages that are the same within a defined tolerance range that comes from different nodes (in this case e.g. master and slave). Such filtering is not possible with the aforementioned HSR standard.

A further embodiment can be referred to as warm standby, in contrast to hot standby. In warm standby, the slave node 2 first of all carries out only a check on the master messages of the data stream 11a, as mentioned further above, and performs no computation or sensor evaluation locally, that is to say does not ascertain any slave data 12 that are redundant in relation to the master data 11. Only if an error has been recognized (e.g. because a master message is absent or plausibilization thereof fails) is the sensor evaluation started in the slave 12 and are the redundant messages sent to the central computer 4. In this embodiment, the decreased redundancy can be used in order to save data stream 12b or to be able to execute other, less critical applications e.g. as a result of the decreased load on the slave.

According to a further embodiment, a data processing unit is used instead of the central computer 4. The central computer 4 thus does not need to have a central function in the overall system. This can involve a data processing unit that is reliant upon redundant, i.e. high-availability, input data.

FIG. 4 shows a system 10a according to a further embodiment of the invention. The system is based on voting in a network coupler: the central computer 4 and the master 1 and slave 2 are situated in different network segments. The check to determine whether the master messages are present correctly is the responsibility of the network coupler 5 rather than the slave 2 in this case. To this end, the network coupler 5 comprises a checking entity 3a. The network coupler 5 uses the aforementioned mechanisms to decide whether the slave message needs to be forwarded. FIG. 4 illustrates this in the event of there being no error.

Network coupling in linear or star topologies: a special case of the network illustrated in FIG. 4 can be considered to be two switched Ethernet segments in which the network coupler is implemented by an Ethernet switch that can perform the aforementioned checks.

FIG. 5 shows a flowchart that shows a method 50 for reducing the data traffic in a network according to an embodiment of the invention. The method comprises method steps 51-54. In method step 51, master data 11 ascertained by a master node are sent to at least one checking entity 3. In method step 52, the master data 11 are syntactically and/or semantically checked by the checking entity 3. If the result of the check on the master data 11 is that there is no error, that is to say in the event of there being no error, method step 53 involves either the master data 11 or slave data 12 ascertained by the slave node 2 being sent from the checking entity 3 to the data processing unit 4. In the event of there being no error, therefore, both master data 11 and slave data 12 are not sent from the slave node 2 to the data processing unit 4. If the result of the check on the master data 11 is that there is an error in the master data 11, that is to say in the event of an error being recognized, however, then method step 54 involves all master data 11 and slave data 12 available through the checking entity 3 being sent from the checking entity 3 to the data processing unit 4. As shown in the flowchart of FIG. 5, the method can be a cycle by virtue of method steps 53 and 54 being followed by the performance of a new cycle, beginning with method step 51.

According to one embodiment, the master node 1, the checking entity 3 and the data processing unit 4 are arranged in a ring topology as shown in FIGS. 1-4.

According to one embodiment, the slave node 2 checks the master data 11 by carrying out the same operations as the master node 1 and thus produces slave data 12 that are redundant in relation to the master data 11, e.g. measurement by means of a sensor. This is also referred to as hot standby.

According to one embodiment, the slave node 2 carries out the same operations as the master node 1 only if the checking entity 3 has recognized an error. This is also referred to as warm standby. This additionally reduces the load in the network and the shutdown of the sensor allows energy to be saved or the available computation power to be used for other tasks.

According to one embodiment, a network coupler 5 that is separate from the slave node 2 comprises or is the checking entity 3.

According to one embodiment, the slave node 2 comprises or is the checking entity 3.

According to one embodiment, the master node 1 comprises or is a further checking entity 3. This allows the master node 1 to monitor the slave data 12 in the same way as the slave node monitors the master data 11.

Some embodiments of the invention have the advantage that the slave actually running as hot standby does not normally load the network, but rather, in the event of an error being recognized by said slave, sends only one data record, that is to say only its slave data that it has generated or only the master data 11 generated by the master node 1. The redundancy (master/slave) that is necessary for the availability of measurement or command data is additionally used for monitoring and deduplication in this case.

The partial relocation of the error recognition to the units reduces the loading on the network and the recipients without impairing redundancy at the same time. As a result, it is also possible for bandwidth-intensive data, such as camera images or radar echoes, to be provided with high availability without increasing unit costs for the network infrastructure.

What is claimed is:

1. A method for reducing the data traffic in a network, the method comprising:
   sending master data from a master node to at least one checking entity comprising a slave node;
   checking, by the checking entity, the master data for an error;
   if no error is identified by the checking step, sending either the master data or slave data determined by the slave node from the checking entity to the data processing unit;
   if an error is identified by the checking step, sending all master data and slave data available on the checking entity from the checking entity to a data processing unit.

2. The method of claim 1, wherein the master node, the checking entity and the data processing unit are arranged in a ring topology.

3. The method of claim 1, wherein the slave node checks the master data by performing the same operations as the master node and thereby produces slave data that are redundant in relation to the master data.

4. The method of claim 1, wherein the slave node performs the same operations as the master node only if the checking entity has identified an error.

5. The method of claim 1, wherein a network coupler that is separate from the slave node comprises the checking entity.

6. The method of claim 1, wherein the master node comprises a further checking entity.

7. A system comprising:
a master node;
a slave node; and
a data processing unit;
wherein the master node, the slave node, and the data processing unit are connected to a ring topology;
wherein the master node is configured to send master data determined by the master node to the data processing unit and to the slave node, respectively, in different ring directions;
wherein the slave node is configured to send slave data determined by the slave node to the data processing unit and to the master node, respectively, in different ring directions; and
wherein the slave node is configured to check the master data, to send only the master data or the slave data to the data processing unit during normal operation, and to send both the master data and the slave data to the data processing unit in the event of an identification of an error.

8. The system of claim 7, wherein the master node is configured to check the slave data, to send only the slave data or the master data to the data processing unit during normal operation, and to send both the master data and the slave data to the data processing unit in the event of an identification of an error.

9. The system of claim 7, wherein the data processing unit is configured to execute a countermeasure in the event of the master node or the slave node failing.

10. The system of claim 7, wherein at least one of the master node or the slave node is configured to identify a failure of a communication link between the master node and the slave node and to send degradation information to the data processing unit in the event of a failure being identified.

11. The system of claim 7, wherein:
the data processing unit is configured to send status information to the master node in the event of a failure of a communication link between the slave node and the data processing unit, and
the master node is configured to forward slave data received from the slave node to the data processing unit in the event of a degradation being identified.

12. The system of claim 7, wherein:
the data processing unit is configured to send status information to the slave node in the event of a failure of a communication link between the master node and the data processing unit, and
the slave node is configured to forward slave data received from the master node to the data processing unit in the event of a degradation being identified.

13. A method for reducing the data traffic in a network including a master node, a slave node, and a data processing unit connected to a ring topology, the method comprising:
sending master data determined by the master node to the data processing unit and to the slave node, respectively, in different ring directions;
sending slave data determined by the slave node to the data processing unit and to the master node, respectively, in different ring directions;
checking the master data by the slave node,
if the checking of the master data indicates normal operation, the slave node sending only the master data or only the slave data to the data processing unit, and
if the checking of the master data indicates an error, the slave node sending both the master data and the slave data to the data processing unit.

14. The method of claim 13, wherein the master node checks the slave data and sends only the slave data or only the master data to the data processing unit during normal operation, and sends both the master data and the slave data to the data processing unit in the event of an error being identified.

* * * * *